United States Patent
Shinohara et al.

(10) Patent No.: US 12,509,599 B2
(45) Date of Patent: Dec. 30, 2025

(54) INK COMPOSITION FOR INKJET AND METHOD FOR INKJET RECORDING

(71) Applicant: MIMAKI ENGINEERING CO., LTD., Nagano (JP)

(72) Inventors: Masanobu Shinohara, Nagano (JP); Hitomi Narumiya, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 932 days.

(21) Appl. No.: 17/610,691

(22) PCT Filed: May 11, 2020

(86) PCT No.: PCT/JP2020/018769
§ 371 (c)(1),
(2) Date: Nov. 11, 2021

(87) PCT Pub. No.: WO2020/235367
PCT Pub. Date: Nov. 26, 2020

(65) Prior Publication Data
US 2022/0213333 A1   Jul. 7, 2022

(30) Foreign Application Priority Data

May 17, 2019   (JP) ................................ 2019-093986
Mar. 18, 2020  (JP) ................................ 2020-047936

(51) Int. Cl.
*C09D 11/033*   (2014.01)
*B41J 2/01*     (2006.01)
(Continued)

(52) U.S. Cl.
CPC .............. *C09D 11/033* (2013.01); *B41J 2/01* (2013.01); *B41J 11/002* (2013.01); *B41M 5/00* (2013.01);
(Continued)

(58) Field of Classification Search
CPC ... C09D 11/033; C09D 11/037; C09D 11/107; C09D 11/38; C09D 11/322; B41J 11/002; B41J 2/01; B41M 5/00
See application file for complete search history.

(56) References Cited

U.S. PATENT DOCUMENTS

2019/0330486 A1   10/2019   Sugihara et al.

FOREIGN PATENT DOCUMENTS

JP   2014214160   11/2014
JP   2014224248   12/2014
(Continued)

OTHER PUBLICATIONS

"International Search Report (Form PCT/ISA/210) of PCT/JP2020/018769," mailed on Jul. 14, 2021, with English translation thereof, pp. 1-4.
(Continued)

*Primary Examiner* — Sophie Hon
(74) *Attorney, Agent, or Firm* — JCIPRNET

(57) ABSTRACT

An ink composition for inkjet and a method for inkjet recording are provided. The ink composition for inkjet includes: a pigment, a water, an alkanediol having a carbon number of 6 or more and 10 or less; and a resin emulsion. A minimum value of a mass ratio of the alkanediol to the ink composition for inkjet is 10%. And, the method includes: performing a typing by attaching an ink composition for inkjet to an ink-unabsorbable or ink-low-absorbable medium. The ink composition for inkjet is prepared by dispersing solutes including a pigment and a resin emulsion in a water including an alkanediol having a carbon number of 6 or more and 10 or less; and the typing is performed by ejecting the ink composition for inkjet on the ink-unabsorbable or ink-low-absorbable medium heated at 50° C. or more and 60° C. or less.

7 Claims, 1 Drawing Sheet

Evaluation of solid image quality

|                          | 1 | 2 | 3 | 4 | Comparison 1 | Comparison 2 | Comparison 3 |
|--------------------------|---|---|---|---|--------------|--------------|--------------|
| Solid image quality (60°C) |   |   |   |   |              |              |              |
| Solid image quality (50°C) |   |   |   |   |              |              |              |
| Solid image quality (40°C) |   |   |   |   |              |              |              |

(51) Int. Cl.
    *B41J 11/00*     (2006.01)
    *B41M 5/00*     (2006.01)
    *C09D 11/037*     (2014.01)
    *C09D 11/107*     (2014.01)
    *C09D 11/322*     (2014.01)
    *C09D 11/38*     (2014.01)

(52) U.S. Cl.
    CPC .......... *C09D 11/037* (2013.01); *C09D 11/107* (2013.01); *C09D 11/322* (2013.01); *C09D 11/38* (2013.01)

(56) References Cited

FOREIGN PATENT DOCUMENTS

| | | | |
|---|---|---|---|
| JP | 2014224248 A | * | 12/2014 |
| JP | 2015091660 | | 5/2015 |
| JP | 2015187231 | | 10/2015 |
| JP | 2016183234 | | 10/2016 |
| JP | 2016183234 A | * | 10/2016 |
| JP | 2019026845 | | 2/2019 |

OTHER PUBLICATIONS

"Office Action of Japan Counterpart Application", issued on Jul. 22, 2025, with English translation thereof, p. 1-p. 22.
Applicant's Opinion on US20190330486.

* cited by examiner

Evaluation of solid image quality
| | 1 | 2 | 3 | 4 | Comparison 1 | Comparison 2 | Comparison 3 |
|---|---|---|---|---|---|---|---|
| Solid image quality (60°C) | 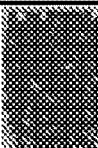 | 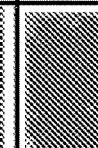 |  | 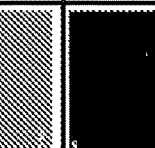 |  |  | 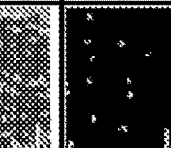 |
| Solid image quality (50°C) |  |  |  |  |  | |  |
| Solid image quality (40°C) |  |  |  |  |  |  |  |

INK COMPOSITION FOR INKJET AND METHOD FOR INKJET RECORDING

CROSS-REFERENCE TO RELATED APPLICATION

This application is a 371 application of the international PCT application serial no. PCT/JP2020/018769, filed on May 11, 2020, which claims the priority benefits of Japan application no. 2019-093986, filed on May 17, 2019, and Japan application no. 2020-047936, filed on Mar. 18, 2020. The entirety of each of the above-mentioned patent applications is hereby incorporated by reference herein and made a part of this specification.

TECHNICAL FIELD

The present invention relates to an ink composition for inkjet and a method for inkjet recording.

BACKGROUND ART

Patent Literature 1 has disclosed a method for inkjet recording using an aqueous ink composition.

CITATION LIST

Patent Literature

Patent Literature 1: Japanese Patent Application Laid-open No. 2015-91660

SUMMARY OF INVENTION

Technical Problem

The aqueous ink composition disclosed in Patent Literature 1 is difficult to provide excellent image quality when typing is performed on a base material having poor wettability to the aqueous ink composition among base materials being low-absorbable to the aqueous ink composition.

Solutions to the Problems

The present invention includes:
(1) an ink composition for inkjet including: a pigment, a water, a water-soluble organic solvent, and a resin emulsion, in which
the water-soluble organic solvent is an alkanediol having a carbon number of 6 or more and 10 or less; and
a minimum value of a mass ratio of the alkanediol to the ink composition for inkjet (Alkanediol/Ink composition for inkjet) is 10%.

When ejecting the ink composition for inkjet having such constitution on a medium preheated to a predetermined temperature for typing (printing), it is possible to obtain excellent typing (printing) quality.
(2) The water-soluble organic solvent is determined to be hexanediol with a carbon number of 6.

When ejecting the ink composition for inkjet employing hexanediol with a carbon number of 6 as the water-soluble organic solvent on the medium preheated to a predetermined temperature for typing (printing), it is possible to improve the solid image quality in solid printing.
(3) A mass ratio of the water and the alkanediol to the ink composition for inkjet ((Water+Alkanediol)/Ink composition for inkjet) is determined to be 85% or more and 90% or less; and
a mass ratio of the alkanediol to the water (Alkanediol/Water) is determined to be 10% or more and 35% or less.

When ejecting the ink composition for inkjet having such constitution on the medium preheated to a predetermined temperature for typing (printing), it is possible to reduce clogging of a nozzle that ejects the ink composition for inkjet. As a result, the deterioration in typing (printing) quality caused by the nozzle omission can be suitably prevented.

In addition, the present invention includes:
(4) a method for inkjet recording, the method including:
performing a typing by attaching an ink composition for inkjet to an ink-unabsorbable or ink-low-absorbable medium (a recording medium), in which
the ink composition for inkjet is prepared by dispersing solutes including a pigment and a resin emulsion in a water including an alkanediol having a carbon number of 6 or more and 10 or less; and
the typing is performed by ejecting the ink composition for inkjet on the ink-unabsorbable or water-low-absorbable medium that is heated, and a lower limit of a heating temperature of the ink-unabsorbable or ink-low-absorbable medium is determined to be 50° C.

When ejecting the ink composition for inkjet having such constitution on the medium preheated to a predetermined temperature for typing (printing), it is possible to obtain excellent typing (printing) quality.
(5) The water-soluble organic solvent is determined to be hexanediol with a carbon number of 6.

When ejecting the ink composition for inkjet employing hexanediol with a carbon number of 6 as the water-soluble organic solvent on the medium preheated to a predetermined temperature for typing (printing), it is possible to improve the solid image quality in solid printing.
(6) A mass ratio of the water and the alkanediol to the ink composition for inkjet ((Water+Alkanediol)/Ink composition for inkjet) is determined to be 85% or more and 90% or less; and
a mass ratio of the alkanediol to the water (Alkanediol/Water) is determined to be 10% or more and 35% or less.

By utilizing such constitution, it is possible to reduce the clogging of the nozzle that ejects the ink composition for inkjet. Therefore, it is possible to suitably prevent deterioration in the typing (printing) quality due to the nozzle omission.
(7) The medium is determined to be any one of vinyl chloride, polyethylene terephthalate, and polypropylene.

By utilizing such constitution, it is possible to perform a typing (printing) to the ink-unabsorbable medium in excellent quality.

Effect of the Invention

According to the present invention, it is possible to obtain an excellent image quality in a typing with respect to a base material having poor wettability.

DESCRIPTION OF THE DRAWINGS

The FIGURE is a view illustrating the results of the solid printing using the ink composition for inkjet.

DESCRIPTION OF EMBODIMENT

Hereinafter, the embodiments of the present invention will be described.

[Ink Composition for Inkjet]

The ink composition for inkjet is an aqueous ink composition for inkjet including a water-insoluble colorant, water, a water-soluble organic solvent, and a resin emulsion.

Performing the method for inkjet recording described below using this ink composition for inkjet allows excellent image quality to be obtained in typing (printing) to the medium having poor wettability to the aqueous ink composition for inkjet.

Here, examples of the medium having poor wettability with respect to the ink composition for inkjet include a film-based medium such as vinyl chloride, polyethylene terephthalate, and polypropylene.

(Water-Insoluble Colorant)

Examples of the water-insoluble colorant include water-insoluble dyes or pigments and the pigments are preferable.

Usable examples of the pigments include carbon black, cadmium red, molybdenum red, chrome yellow, cadmium yellow, titanium yellow, chromium oxide, viridian, titanium cobalt green, ultramarine blue, Prussian blue, cobalt blue, diketopyrrolopyrroles, anthraquinone, benzimidazolone, anthrapyrimidine, azo-based pigments, phthalocyanine-based pigments, quinacridone-based pigments, isoindolinone-based pigments, dioxazine-based pigments, threne-based pigments, perylene-based pigments, perinone-based pigments, thioindigo-based pigments, quinophthalone-based pigments, or metal complexes.

The aqueous ink composition for inkjet may include any pigment conventionally used in aqueous ink compositions for inkjet. As the pigment, for example, organic pigments or inorganic pigments conventionally used in aqueous ink compositions for inkjet may be used.

As the inorganic pigment, titanium oxide, iron oxide, and carbon black may be used.

As the organic pigment, azo pigments (for example, azo lakes, insoluble azo pigments, condensed azo pigments, or chelate azo pigments), polycyclic pigments (for example, phthalocyanine pigments, perylene pigments, perinone pigments, anthraquinone pigments, quinacridone pigments, dioxazine pigments, thioindigo pigments, isoindolinone pigments, or quinophthalone pigments), dye chelates (for example, basic dye-type chelates or acidic dye-type chelates), nitro pigments, nitroso pigments, aniline blacks, or the like may be used. Of these pigments, pigments having excellent affinity for water are preferably used.

The particle diameter of the pigment is not particularly limited. The average particle diameter is preferably 25 μm or less, more preferably 2 μm or less, and further preferably 0.5 μm or less. Use of the pigment having an average particle diameter of 25 μm or less allows generation of the clogging of the nozzle described below to be reduced.

The content of the pigment is 1.0% or more and 5.0% or less, preferably 1.5% or more and 4.0% or less, and more preferably 1.7% or more and 3.8% or less in terms of a mass ratio (Pigment/Ink composition for inkjet) relative to the entire ink composition for inkjet.

(Resin Emulsion)

The above pigment is fixed on the medium after typing (printing) using a water-soluble resin.

The ink composition for inkjet is provided by dispersing the above pigment together with the water-soluble resin in a solvent component.

Examples of the water-soluble resin that can be used for dispersing pigments include polyvinyl alcohols, polyvinylpyrrolidones, polyacrylic acids, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinylnaphthalene-acrylic acid copolymers, vinylnaphthalene-maleic acid copolymers, vinyl acetate-maleic acid ester copolymers, vinyl acetate-crotonic acid copolymers, vinyl acetate-acrylic acid copolymers, and the salts thereof. Of these water-soluble resins, copolymers made of a monomer having a hydrophobic functional group and a monomer having a hydrophilic functional group and polymers made of a monomer having both hydrophobic functional group and hydrophilic functional group are particularly preferable. As the form of the copolymer, any form of random copolymers, block copolymers, alternating copolymers, and graft copolymers may be used.

Here, considering a fixing property of the aqueous ink composition for inkjet described below to the medium being low-absorbable (ink-unabsorbable recording medium), acrylic resin materials are preferable.

At the time of preparing the aqueous ink composition for inkjet, the emulsion of the acrylic resin material is used.

The resin material may be arbitrarily selected depending on the medium to be printed (ink-unabsorbable recording medium).

(Water and Water-Soluble Organic Solvent)

Water and the water-soluble organic solvent are the main solvents of the ink composition for inkjet and are components that are evaporated and scattered at the drying step of the method for inkjet recording described below.

The water is preferably water from which ionic impurities are removed as much as possible such as pure water or ultrapure water including ion-exchanged water, ultrafiltered water, reverse osmosis water, and distilled water.

The water-soluble organic solvent is the alkanediol having a carbon number of 6 to 10.

Examples of the alkanediol include hexanediol (carbon number: 6), heptanediol (carbon number: 7), octanediol (carbon number: 8), nonanediol (carbon number: 9), and decanediol (carbon number: 10).

An alkanediol at least having a higher boiling point than that of 1,2-propanediol and having lower volatility than that of 1,2-propanediol is preferable.

Hexanediol may be any of 1,2-hexanediol, 1,3-hexanediol, 1,4-hexanediol, 1,5-hexanediol, and 1,6-hexanediol. 1,2-Hexanediol is preferable due to the wettability to the medium described below.

Heptanediol may be any of 1,2-heptanediol, 1,3-heptanediol, 1,4-heptanediol, 1,5-heptanediol, 1,6-heptanediol, and 1,7-heptanediol.

Octanediol may be any of 1,2-octanediol, 1,3-octanediol, 1,4-octanediol, 1,5-octanediol, 1,6-octanediol, 1,7-octanediol, and 1,8-octanediol.

Nonanediol may be any of 1,2-nonanediol, 1,3-nonanediol, 1,4-nonanediol, 1,5-nonanediol, 1,6-nonanediol, 1,7-nonanediol, 1,8-nonanediol, and 1,9-nonanediol.

Decanediol may be any of 1,2-decanediol, 1,3-decanediol, 1,4-decanediol, 1,5-decanediol, 1,6-decanediol, 1,7-decanediol, 1,8-decanediol, 1,9-decanediol, and 1,10-decanediol.

The mass ratio of the alkanediol to the ink composition for inkjet (Alkanediol/Ink composition for inkjet) is preferably 10% or more. In other words, the minimum value of the mass ratio of the alkanediol to the ink composition for inkjet (Alkanediol/Ink composition for inkjet) is preferably 10%.

The mass ratio (Water+Alkanediol/Ink composition for inkjet) of water and the alkanediol to the ink composition for inkjet is preferably 85% or more and 90% or less.

The mass ratio of the alkanediol to water (Alkanediol/Water) is 10% or more and 35% or less, preferably 15% or more and 25% or less, and more preferably 17% or more and 20% or less.

The ink composition for inkjet having a small mass ratio of the alkanediol to the ink composition for inkjet tends to cause the clogging of the nozzle of the inkjet head at the time of performing the method for inkjet recording described below.

The ink composition for inkjet having a small mass ratio of the alkanediol to water tends to cause the clogging of the nozzle of the inkjet head at the time of performing the method for inkjet recording described below.

In particular, the ink composition for inkjet having a mass ratio of the alkanediol to water of less than 10% causes significant clogging.

The ink composition for inkjet having a large mass ratio of the alkanediol to the ink composition for inkjet tends to reduce the omission at the time of performing solid printing by the method for inkjet recording described below (to improve image quality).

However, the ink composition for inkjet having a mass ratio of the alkanediol to water of more than 30% tends to deteriorate the image quality due to more omission in solid printed matter as compared with the case of the ink composition for inkjet having a mass ratio of 30% or less.

Determining the mass ratio of the alkanediol to water to be in the above range allows the omission of the solid printed matter to be reduced while the clogging of the nozzle is being reduced at the time of performing the method for inkjet recording described below. This allows the printing quality of the printed matter (typed matter) to be improved.

The ink composition for inkjet according to the present embodiment may further include a pH adjuster, a preservative agent or fungicide, a rust-preventive agent, and a chelating agent.

The viscosity of the ink composition for inkjet at 20° C. is preferably 2 mPa·s or more and 20 mPa·s or less and more preferably 3 mPa·s or more and 10 mPa·s or less.

Here, the viscosity of the ink composition for inkjet can be measured using a conventionally known viscometer in a state where the temperature of the aqueous ink composition is maintained at 20° C.

[Method for Inkjet Recording]

The method for inkjet recording according to the present embodiment is performed in accordance with the following procedures.

(a) A medium to be typed is heated to a temperature range of 40° C. or more and 60° C. or less by a heating means attached to an inkjet recording device (heating step).

(b) Ink droplets of the ink composition for inkjet are ejected from each nozzle of the inkjet head arranged facing the medium toward the medium heated to the above temperature range to type (typing step).

(c) Water and the water-soluble organic solvent are evaporated from the ink droplets landed on the medium to fix the solid content of the ink composition for inkjet on the medium (drying step).

The drying step is performed by heating the medium to a temperature range of 50° C. or more and 90° C. or less by a printer heater and a dryer.

Here, the medium used for inkjet recording is an ink-unabsorbable or ink-low-absorbable recording medium.

Examples of the ink-unabsorbable recording medium include resin films such as polyvinyl chloride, polyethylene terephthalate, polycarbonate, polystyrene, polyurethane, polyethylene, and polypropylene.

A medium in which the surface of a base material such as a woven fabric fabric cloth) or paper is coated with the resin also corresponds to the ink-unabsorbable medium in the present specification.

As an ink-low-absorbable recording medium, art paper, coated paper, matte paper and the like are exemplified.

The term "unabsorbable or low-absorbable medium" in the present specification means a recording medium made of a base material that is difficult for the landed ink to penetrate.

As one example, a medium having a water absorption amount of 0 $g/m^2$ or more and 10 $g/m^2$ or less at a contact time of pure water with the medium of 100 ms (millisecond) milliseconds with pure water is exemplified.

As the method for ejecting the inkjet from the inkjet head, any conventionally known methods can be used.

In particular, a method for ejecting droplets by utilizing the vibration of a piezoelectric element (a method for recording using an inkjet head that forms ink droplets by mechanical deformation of an electrolytic strain element) is preferable. This is because an excellent typing result (including an image formation result) can be obtained.

The heating means is a heater that can heat the medium. The heater may be a heater that can heat the medium such as a heater that is provided in contact with the medium and directly heats the medium and a heater that is arranged close to the medium and indirectly heats the medium.

The heating temperature of the medium at the heating step is preferably in a temperature range of 40° C. or more and 60° C. or less.

At the typing step in an inkjet recording device, the inkjet head moves in the vicinity of the surface (surface to be typed) of the heated medium. The nozzle ejecting the ink droplets is provided on a part of the inkjet head facing the medium and the inkjet head ejects the ink droplets from the nozzle toward the medium.

A high heating temperature of the medium at the heating step before typing may cause the clogging of the nozzle due to evaporation of water included in the ink composition for inkjet at the time of moving the inkjet head across the surface of the heated medium.

A heating temperature of the medium higher than 60° C. causes significant nozzle clogging. Therefore, the heating temperature of the medium at the heating step is preferably 60° C. or lower.

A heating temperature of the medium lower than 40° C. requires longer time necessary for evaporating water and the water-soluble organic solvent from the ink droplets landing on the medium.

This causes the ink droplets landing on the surface of the medium to gather due to surface tension from the typing (printing step) by landing the ink droplets on the medium to the completion of the drying step. Consequently, distortion, omission, or the like of the typed matter is likely to occur.

The heating temperature of the medium at the drying step is set in a temperature range so that the solvent components (for example, water and alkanediol) included in the ink droplets landing on the surface of the medium can be completely evaporated. This setting is for fixing the solid content (for example, pigment and acrylic resin) included in the ink composition for inkjet to the medium.

The heating temperature at the drying step is appropriately set depending on the transport speed and the transport distance of the medium at the drying step.

Hereinafter, the case where solid printing is performed by the above method for inkjet recording using the ink composition for inkjet having the composition listed in Table 1 below will be described.

The FIGURE is a view illustrating the result of the solid printing using the ink composition for inkjet according to the present embodiment.

[Ink Composition for Inkjet]

Ink 1 to Ink 4 listed in Table 1 below are ink compositions for inkjet using 1,2-hexanediol alone as the water-soluble organic solvent.

Comparison 1 is an ink composition for inkjet using a mixed solvent of 1,2-hexanediol and dipropylene glycol monomethyl ether as the water-soluble organic solvent.

Comparison 2 is an ink composition for inkjet in which a mixed solvent of 1,2-propanediol and dipropylene glycol monomethyl ether is used as the water-soluble organic solvent instead of 1,2-hexanediol.

Comparison 3 is an ink composition for inkjet in which 1,2-propanediol is used as the water-soluble organic solvent instead of 1,2-hexanediol.

All of Ink 1 to Ink 4 and Comparisons 1, 2, and 3 use an acrylic resin as a binder component. In addition, these compositions include a silicone-based surface-active agent.

These Ink 1 to Ink 4 and Comparisons 1, 2, and 3, which are the ink compositions for inkjet, are prepared by adding the water-soluble organic solvent to a high concentration liquid (a liquid having a high solid content ratio in which the pigment, the acrylic resin emulsion, and the silicone-based surface-active agent are previously dispersed in water).

Specifically, to the high concentration liquid in a state of stirring with a dissolver or the like, the water-soluble organic solvent is gradually added to prepare the ink composition for inkjet in which the solid content (the pigment, the acrylic resin, and the silicone-based surface-active agent) is dispersed in the solvent (water and the water-soluble organic solvent).

[Solid Printing]

The solid printing was performed to a medium made of polyvinyl chloride using an inkjet printer (JV150-160) manufactured by Mimaki Engineering Co., Ltd.

The printing conditions are 100% density solid printing (resolution: 720 dpi×1,080 dpi, 12 passes). The solid printing was performed so that the amount of used ink per 1 $m^2$ was 18.0 g to 20.0 g and more preferably 18.5 g to 19.5 g.

The evaluation of the printed matter was performed on the following two items.

(a) Nozzle Omission.

The heater temperature (print heater temperature) of the inkjet printer (JV150-160) was set to 60° C. and drawing was continuously performed for 30 minutes. Thereafter, the test drawing pattern incorporated in the inkjet printer was printed. The number of nozzles in which nozzle omission occurs was counted.

(b) Solid Image Quality

Under three conditions where the heating temperatures of the medium before typing were set to 40° C., 50° C., and 60° C., 100% density solid printings (resolution: 720 dpi×1,080 dpi, 12 passes) were performed. The obtained solid printed matters were confirmed visually and by being magnified with a microscope to perform rating. The criteria for the rating are as follows.

5: No white spots are confirmed in the image by observing with a microscope (no places where the surface of the base material is observed exist).
4: Significantly slight amounts of white spots are confirmed in the image by observing with a microscope.
3: A lot of unevenness exists in the solid image when the solid image is visually confirmed.
2: Many white spots exist in the solid image when the solid image is visually confirmed.
1: The solid image is clearly totally or partially unfilled with the ink composition for inkjet when the solid image is visually confirmed.

TABLE 1

| <Ink composition> | 1 | 2 | 3 | 4 | Comparison 1 | Comparison 2 | Comparison 3 |
|---|---|---|---|---|---|---|---|
| Magenta pigment | 3.8% | | | | 3.8% | 3.8% | |
| Cyan pigment | | 1.7% | | | | | |
| Yellow pigment | | | 3.0% | | | | |
| Black pigment | | | | 3.5% | | | 3.5% |
| Acrylic resin | 9.0% | 9.0% | 9.0% | 9.0% | 9.0% | 9.0% | 9.0% |
| 1,2-Hexanediol | 15.0% | 21.0% | 17.0% | 14.0% | 8.0% | | |
| 1,2-Propanediol | | | | | 8.0% | 22.0% | 15.0% |
| DPM | | | | | | 10.0% | |
| Silicone-based surface-active agent | 0.5% | 0.5% | 0.5% | 0.5% | 0.5% | 0.5% | 0.5% |
| Water | 71.7% | 67.8% | 70.5% | 73.0% | 70.7% | 54.7% | 72.0% |
| Mass ratio (Water + 1,2-Hexanediol/Ink composition for inkjet) | 86.7% | 88.8% | 87.5% | 87.0% | 78.7% | — | — |
| Mass ratio (1,2-Hexanediol/Water) | 20.9% | 30.9% | 24.1% | 19.1% | 11.3% | — | — |
| <Evaluation of nozzle omission> | | | | | | | |
| Amount of used ink per 1 $m^2$ (g) | 18.8 | 19.5 | 19.8 | 18.6 | 19.5 | 19.5 | 18.6 |
| Number of nozzle omission | 0 | 0 | 0 | 0 | 11 | 0 | 34 |
| <Solid image quality> | | | | | | | |
| Solid image (60° C.) | 5 | 5 | 5 | 5 | 3 | 2 | 3 |
| Solid image (50° C.) | 4 | 4 | 5 | 4 | 2 | 1 | 2 |
| Solid image (40° C.) | 2 | 2 | 3 | 3 | 1 | 1 | 2 |

DPM: dipropylene glycol monomethyl ether

As is clear from Table 1, in the case where the heating temperature of the medium before typing is 60° C., the nozzle omission does not occur when 1,2-hexanediol alone is used as the water-soluble organic solvent (Inks 1 to Ink 4). The heating temperature of the medium of 60° C. is a temperature that is the highest temperature under the above three conditions of solid printing and is the temperature at which the nozzle omission is likely to occur.

On the other hand, in the case where the heating temperature of the medium before typing is 60° C., which is the same temperature as the above temperature, use of 1,2-propanediol as the water-soluble organic solvent (Comparison 3) causes the nozzle omission.

Use of both 1,2-hexanediol and dipropylene glycol monomethyl ether as the water-soluble organic solvents (Comparison 1) also causes the nozzle omission.

1,2-Hexanediol (boiling point: 223° C.) has a higher boiling point and a slower evaporation rate than those of 1,2-propanediol (boiling point: 188° C.) and dipropylene glycol monomethyl ether (boiling point: 194° C.).

Therefore, the ink composition for inkjet including 1,2-hexanediol is less likely to evaporate when subjected to the heat of heated medium than the ink composition for inkjet not including 1,2-hexanediol.

The degree of ease of evaporation affects the presence or absence of the nozzle omission and the largeness or smallness of the degree of the nozzle omission.

In other words, use of a water-soluble organic solvent having a low boiling point causes the clogging of the nozzle due to drying of the ink composition in the nozzle by the heat of the heated medium at the time of printing on the heated medium.

As listed in Ink 1 to Ink 4, including more water-soluble organic solvent having a higher boiling point in the ink composition allows the generation of the nozzle clogging due to drying of the ink composition in the nozzle to be suitably reduced at the time of printing on the heated medium.

In Comparison 2, the reason why the nozzle omission is zero (=0) is because the amount of the water-soluble organic solvent in the ink composition in Comparison 2 is larger than those of other inks. A large amount of the water-soluble organic solvent results in longer time until the water-soluble organic solvent included in the ink composition evaporates. Consequently, the nozzles are less likely to be clogged.

The ease of evaporation of the ink composition for inkjet affects the image quality of solid printing.

The solid image quality in the case where the heating temperature of the medium before typing is 60° C. is excellent in the case where 1,2-hexanediol alone is included as the water-soluble organic solvent (Ink 1 to Ink 4).

In contrast, the image quality is deteriorated in the following cases (refer to The FIGURE).

(a) When both 1,2-hexanediol and dipropylene glycol monomethyl ether are used as the water-soluble organic solvents (Comparison 1).
(b) When both 1,2-propanediol and dipropylene glycol monomethyl ether (DPM) are used as the water-soluble organic solvents (Comparison 2).
(c) When 1,2-propanediol is used as the water-soluble organic solvent (Comparison 3).

In addition, even when 1,2-hexanediol alone is used as the water-soluble organic solvent (Ink 1 to Ink 4), as the heating temperature of the medium before typing becomes lower, the solid image quality is more deteriorated.

Here, typing on an unheated medium causes the shape of the droplets of the ink droplets landed on the surface of the medium at the position of landing to be unable to be retained from the typing (printing process) by landing the ink droplets on the medium until the completion of the drying step and thus the typing (printing) quality is deteriorated.

As the cause of this phenomenon, it is conceivable that the landed ink droplets spread on the surface of the medium and thus that the shape cannot be retained or that the adjacent ink droplets gather with each other due to surface tension or the like to form empty spaces on the surface of the medium.

It can be determined that the reason why the solid image quality is more improved as the heating temperature of the medium before typing becomes higher is because 1,2-hexanediol provides a preferable effect on retaining the shape of the landed ink droplets.

Specifically, the higher heating temperature before typing promotes the volatilization of volatile components (water and the water-soluble organic solvent) included in the ink composition for inkjet immediately after landing.

As the cause of this phenomenon, it is conceivable that the viscosity of the landed ink droplets increases (thickens) depending on the volatilized amount of volatilized components to easily retain the shape of the ink droplets or that the movement of the ink droplets is restricted and thus that the surface of the medium is difficult to expose.

As described above, the present embodiments include:
(1) an ink composition for inkjet including: a pigment, a water, a water-soluble organic solvent, and a resin emulsion, in which
the water-soluble organic solvent is an alkanediol having a carbon number of 6 or more and 10 or less; and
a minimum value of a mass ratio of the alkanediol to the ink composition for inkjet (Alkanediol/Ink composition for inkjet) is 10%.

When ejecting the ink composition for inkjet having such constitution on the medium preheated to a predetermined temperature for typing (printing), it is possible to obtain excellent typing quality.

(2) The water-soluble organic solvent is determined to be hexanediol with a carbon number of 6.

When ejecting the ink composition for inkjet employing hexanediol with a carbon number of 6 as the water-soluble organic solvent on the medium preheated to a predetermined temperature for typing (printing), it is possible to improve the solid image quality in solid printing.

In addition, the clogging of the nozzle ejecting the ink composition for inkjet can be reduced. This allows the typing (printing) quality caused by the nozzle omission to be suitably prevented.

(3) A mass ratio of the water and the alkanediol to the ink composition for inkjet ((Water+Alkanediol)/Ink composition for inkjet) is determined to be 85% or more and 90% or less; and
a mass ratio of the alkanediol to the water (Alkanediol/Water) is determined to be 10% or more and 35% or less.

When ejecting the ink composition for inkjet having such constitution on the medium preheated to a predetermined temperature for typing (printing), it is possible to reduce clogging of a nozzle that ejects the ink composition for inkjet. This allows deterioration in the typing (printing) quality caused by the nozzle omission to be suitably prevented.

In addition, the present invention includes:
(4) a method for inkjet recording, the method including:
performing a typing by attaching an ink composition for inkjet to an ink-unabsorbable or ink-low-absorbable medium (a recording medium), in which the ink composition for inkjet is prepared by dispersing solutes including a pigment and a resin emulsion in a water including an alkanediol having a carbon number of 6 or more and 10 or less;

the method for inkjet recording is a method for performing the typing by ejecting the ink composition for inkjet on the ink-unabsorbable or water-low-absorbable medium that is heated; and a lower limit of a heating temperature of the ink-unabsorbable or ink-low-absorbable medium is determined to be 50° C.

By utilizing such constitution, it is possible to obtain excellent typing (printing) results, even when the ink-low-absorbable medium that are less suitable for typing (printing) with the aqueous ink composition for inkjet is used.

In this case, the heating temperature of the ink-unabsorbable medium is 40° C. or more and 70° C. or less and more preferably 50° C. or more and 60° C. or less.

As the alkanediol having higher boiling point is used, the clogging of the nozzle for ejecting the ink composition for inkjet on the heated medium is more reduced.

As the heating temperature of the medium becomes higher, use of the alkanediol having a high boiling point as the water-soluble organic solvent allows the clogging of the nozzle to be reduced and thus excellent typing (printing) result can be obtained.

(5) A minimum value of the mass ratio of the alkanediol to the ink composition for inkjet (Alkanediol/Ink composition for inkjet) is determined to be 10%.

(6) A mass ratio of the water and the alkanediol to the ink composition for inkjet ((Water+Alkanediol)/Ink composition for inkjet) is determined to be 85% or more and 90% or less; and a mass ratio of the alkanediol to the water (Alkanediol/Water) is determined to be 10% or more and 35% or less.

By utilizing such constitution, it is possible to reduce gathering of the ink droplets due to surface tension, while the shape of the ink droplets landed on the medium is maintained after the typing (printing) by ejecting the ink composition for inkjet to the medium previously heated to the predetermined temperature until the removal of the solvent component in the ink composition for inkjet by drying.

This allows the typed matter (printed matter) obtained by using the aqueous ink composition for inkjet to be prepared in excellent typing quality.

(7) The water-soluble organic solvent is determined to be hexanediol with a carbon number of 6.

By utilizing such constitution, it is possible to improve the solid image quality in printing.

The clogging of the nozzle ejecting the ink composition for inkjet is also reduced. This allows the typing (printing) quality caused by the nozzle omission to be suitably prevented.

(8) The medium is determined to be any one of vinyl chloride, polyethylene terephthalate, and polypropylene.

These media are one example of media (ink-unabsorbable media) being low-absorbable to the aqueous ink composition for inkjet.

Use of the ink composition for inkjet having the above constitution allows typing (printing) to these ink-unabsorbable media to be performed in excellent quality.

As described above, the embodiments according to the present invention have been described. The present invention is not limited to the above aspects. The present invention can be appropriately modified within the scope of the technical ideas of the present invention.

The invention claimed is:

1. An ink composition for inkjet attached to a medium, comprising:
a pigment;
water;
a silicone-based surface-active agent;
a water-soluble organic solvent; and
a resin emulsion,
wherein
the water-soluble organic solvent is an alkanediol having a carbon number of 6 or more and 10 or less; and
a mass ratio of the alkanediol to the ink composition for inkjet (Alkanediol/Ink composition for inkjet) is at least 10%,
wherein
a mass ratio of the water and the alkanediol to the ink composition for inkjet ((Water+Alkanediol)/Ink composition for inkjet) is 85% or more and 90% or less; and
a mass ratio of the alkanediol to the water (Alkanediol/Water) is 17% or more and 35% or less,
the medium is an ink-unabsorbable medium or an ink-low-absorbable medium,
the ink-unabsorbable medium at least comprises a base material having a surface coated with a resin,
the ink-low-absorbable medium at least comprises a matte paper, and
the ink-unabsorbable medium and the ink-low-absorbable medium have a water absorption amount of 10 $g/m^2$ or less at a contact time of pure water with the medium of 100 milliseconds.

2. The ink composition for inkjet attached to a medium according to claim 1, wherein
the water-soluble organic solvent is hexanediol with a carbon number of 6.

3. The ink composition for inkjet attached to a medium according to claim 1, wherein
the mass ratio of the alkanediol to the water (Alkanediol/Water) is 17% or more and 25% or less.

4. The ink composition for inkjet attached to a medium according to claim 1, wherein
the mass ratio of the alkanediol to the water (Alkanediol/Water) is 17% or more and 20% or less.

5. A method for inkjet recording, the method comprising:
performing a typing by attaching an ink composition for inkjet to an ink-unabsorbable or an ink-low-absorbable medium,
wherein
the ink composition for inkjet is prepared by dispersing solutes including a pigment and a resin emulsion in water including a silicone-based surface-active agent and an alkanediol having a carbon number of 6 or more and 10 or less;
wherein
a mass ratio of the water and the alkanediol to the ink composition for inkjet ((Water+Alkanediol)/Ink composition for inkjet) is 85% or more and 90% or less;
a mass ratio of the alkanediol to the water (Alkanediol/Water) is 17% or more and 35% or less,
the ink-unabsorbable medium at least comprises a base material having a surface coated with a resin, and the ink-low-absorbable medium at least comprises a matte paper, the ink-unabsorbable medium and the ink-low-absorbable medium have a water absorption amount of 10 g/m² or less at a contact time of pure water with the medium of 100 milliseconds; and the typing is performed by ejecting the ink composition for inkjet on the ink-unabsorbable or the ink-low-absorbable medium that is heated, and a lower limit of a heating temperature of the ink-unabsorbable or the ink-low-absorbable medium is determined to be 50° C.

6. The method for inkjet recording according to claim 5, wherein the alkanediol is hexanediol with a carbon number of 6.

7. The method for inkjet recording according to claim 5, wherein the resin is any one of vinyl chloride, polyethylene terephthalate, and polypropylene.

* * * * *